United States Patent
Chen et al.

(10) Patent No.: US 10,368,047 B2
(45) Date of Patent: Jul. 30, 2019

(54) SIX-DEGREE OF FREEDOM VIDEO PLAYBACK OF A SINGLE MONOSCOPIC 360-DEGREE VIDEO

(71) Applicant: ADOBE INC., San Jose, CA (US)

(72) Inventors: Zhili Chen, San Jose, CA (US); Duygu Ceylan Aksit, Mountain View, CA (US); Jingwei Huang, Stanford, CA (US); Hailin Jin, San Jose, CA (US)

(73) Assignee: ADONE INC., San Jose, CA (US)

( * ) Notice: Subject to any disclaimer, the term of this patent is extended or adjusted under 35 U.S.C. 154(b) by 187 days.

(21) Appl. No.: 15/433,333

(22) Filed: Feb. 15, 2017

(65) Prior Publication Data

US 2018/0234669 A1  Aug. 16, 2018

(51) Int. Cl.
*H04N 13/00* (2018.01)
*H04N 13/117* (2018.01)
(Continued)

(52) U.S. Cl.
CPC .......... *H04N 13/117* (2018.05); *G06F 3/012* (2013.01); *G06T 15/20* (2013.01); *H04N 5/23238* (2013.01); *H04N 13/144* (2018.05); *H04N 13/207* (2018.05); *H04N 13/366* (2018.05); *H04N 13/373* (2018.05);
(Continued)

(58) Field of Classification Search
CPC .. H04N 13/117; H04N 13/366; H04N 13/373; H04N 13/376; H04N 13/378; H04N 13/38; H04N 13/207; H04N 13/144; H04N 5/23238; H04N 13/344; H04N 2213/002; G06T 15/20; G06F 3/012
See application file for complete search history.

(56) References Cited

U.S. PATENT DOCUMENTS

2013/0278727 A1* 10/2013 Tamir ................... H04N 13/261
348/47
2015/0062125 A1* 3/2015 Aguilera Perez ..... G06T 19/003
345/427
(Continued)

OTHER PUBLICATIONS

Shen, S. (2013). Accurate multiple view 3d reconstruction using patch-based stereo for large-scale scenes. IEEE transactions on image processing, 22(5), 1901-1914.
Huang, J., Chen, Z., Ceylan, D., & Jin, H. (Mar. 2017). 6-DOF VR videos with a single 360-camera. In Virtual Reality (VR), 2017 IEEE (pp. 37-44). IEEE.

*Primary Examiner* — Joseph Suh
(74) *Attorney, Agent, or Firm* — Shook, Hardy & Bacon L.L.P.

(57) ABSTRACT

A stereoscopic six-degree of freedom viewing experience with a monoscopic 360-degree video is provided. A monoscopic 360-degree video of a subject scene can be processed by analyzing each frame to recover a three-dimensional geometric representation, and recover a camera motion path. Utilizing the recovered three-dimensional geometric representation and camera motion path, a dense three-dimensional geometric representation of the subject scene is generated. The processed video can be provided for stereoscopic display via a device. As motion of the device is detected, novel viewpoints can be stereoscopically synthesized for presentation in real time, so as to provide an immersive virtual reality experience based on the original monoscopic 360-degree video and the detected motion of the device.

20 Claims, 8 Drawing Sheets

(51) Int. Cl.
*H04N 5/232* (2006.01)
*G06F 3/01* (2006.01)
*H04N 13/144* (2018.01)
*H04N 13/207* (2018.01)
*H04N 13/373* (2018.01)
*H04N 13/376* (2018.01)
*H04N 13/378* (2018.01)
*H04N 13/38* (2018.01)
*H04N 13/366* (2018.01)
*G06T 15/20* (2011.01)
*H04N 13/344* (2018.01)

(52) U.S. Cl.
CPC ......... *H04N 13/376* (2018.05); *H04N 13/378* (2018.05); *H04N 13/38* (2018.05); *H04N 13/344* (2018.05); *H04N 2213/002* (2013.01)

(56) References Cited

U.S. PATENT DOCUMENTS

| | | | |
|---|---|---|---|
| 2015/0163406 A1* | 6/2015 | Laroia | G02B 27/58 348/208.1 |
| 2015/0370322 A1* | 12/2015 | Gustafson | G06F 3/1423 345/156 |
| 2017/0019655 A1* | 1/2017 | Mueller | H04N 13/0217 |
| 2017/0108338 A1* | 4/2017 | Larnaout | G01C 21/005 |
| 2017/0243069 A1* | 8/2017 | Shen | G06T 7/80 |
| 2017/0272724 A1* | 9/2017 | Lim | H04N 13/15 |
| 2017/0309031 A1* | 10/2017 | Wu | G06K 9/00335 |
| 2018/0075591 A1* | 3/2018 | Du | G06F 3/14 |
| 2018/0189254 A1* | 7/2018 | Sutton | G06F 3/013 |
| 2018/0234669 A1* | 8/2018 | Chen | H04N 5/23238 |

\* cited by examiner

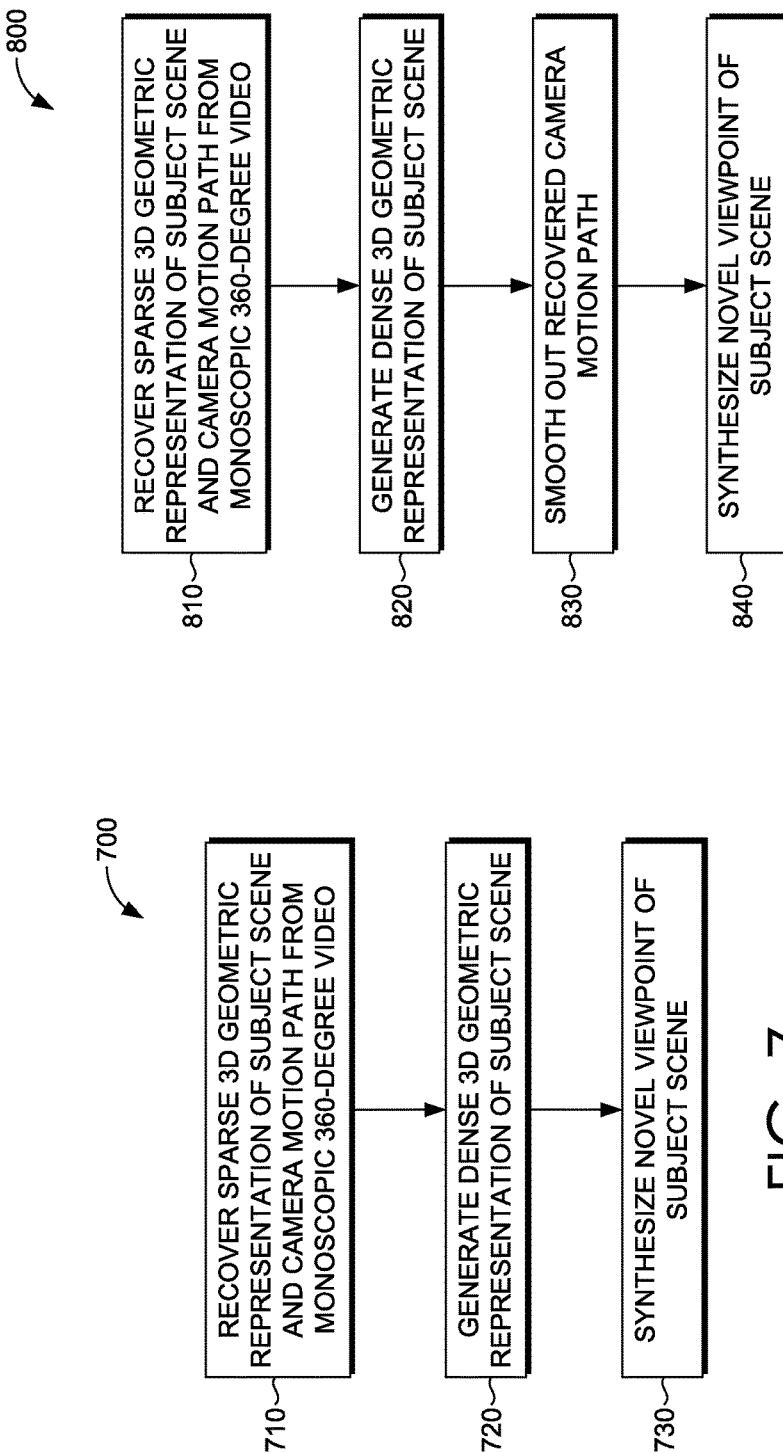

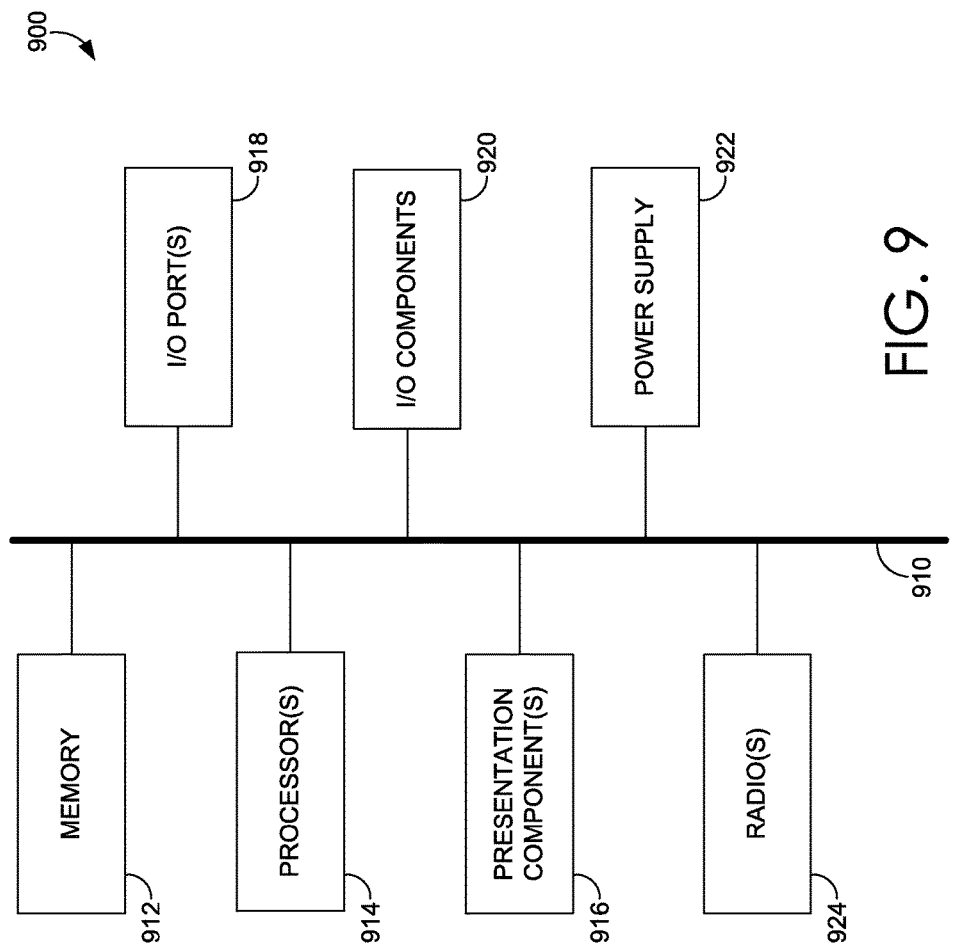

US 10,368,047 B2

SIX-DEGREE OF FREEDOM VIDEO PLAYBACK OF A SINGLE MONOSCOPIC 360-DEGREE VIDEO

BACKGROUND

The rapidly-growing virtual reality (VR) market has spurred demand for cameras that enable users to create their own content. 360-degree cameras are made available in many forms, a popular form-factor for many novice users being the monoscopic 360-degree video camera. The 360-degree monoscopic video camera can generally record a flat, equi-rectangular spherical video that, when viewed, can be analogized to viewing a world map on a globe. When viewed from a virtual reality headset, one may describe the viewing experience as sitting inside of the globe and viewing the video along the inner surface of the globe.

A virtual reality headset, when paired with motion tracking technology, can give a viewer the illusion that he or she is inside of a scene. One of the downsides to monoscopic videos, however, is that the content is rendered the same for both of the viewer's eyes. That is, the viewer cannot experience the scene as having three-dimensional depth. Another downside is that monoscopic videos, like some stereoscopic videos, can only respond to viewers' rotational motions, as image data for translational motions are unavailable, further limiting a fully-immersive experience. To provide a viewer with a fully-immersive experience, videos must be recorded both stereoscopically, and from many positions around the scene. In this way, the viewer's rotational and translational motions can be considered when the frames are rendered, so that the viewer can realistically perceive depth-of-field within the virtual environment as they are moving about. Needless to say, a lack of depth-of-field in some videos can cause motion sickness, as the visual feedback provided by the virtual headset can confuse viewers when failing to respond to a full range of viewer head movements.

SUMMARY

Embodiments of the present invention relate to, among other things, techniques for providing six-degree of freedom viewing of a monoscopic 360-degree video. In particular, embodiments of the present invention are directed toward systems, methods, and computer storage media for reconstructing a three-dimensional model of a subject scene in a monoscopic 360-degree video to provide a virtual or stereoscopic rendition of the video, and in real-time, transform views of the three-dimensional model in response to the viewer's detected motions. By analyzing a monoscopic 360-degree video of a subject scene, a sparse three-dimensional geometric representation of the subject scene and a camera motion path that are associated with the video can be recovered. The recovered sparse three-dimensional geometric representation of the subject scene and camera motion path can then be processed to generate a dense three-dimensional representation of the scene. When the dense three-dimensional representation, guided by the camera path, is provided for display via a device, such as a head-mounted display, the viewer's physical orientation and translational movements can be tracked, which can be utilized to synthesize novel viewpoints of the scene in real-time.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 7 is a flow diagram showing a method for providing six-degree of freedom viewing of a monoscopic 360-degree video, in accordance with some implementations of the present disclosure;

FIG. 8 is a flow diagram showing a method for providing stabilized and six-degree of freedom viewing of a monoscopic 360-degree video, in accordance with some implementations of the present disclosure; and FIG. 9 is a block diagram of an exemplary computing environment suitable for use in accordance with some implementations of the present disclosure.

DETAILED DESCRIPTION

Figure 1A:
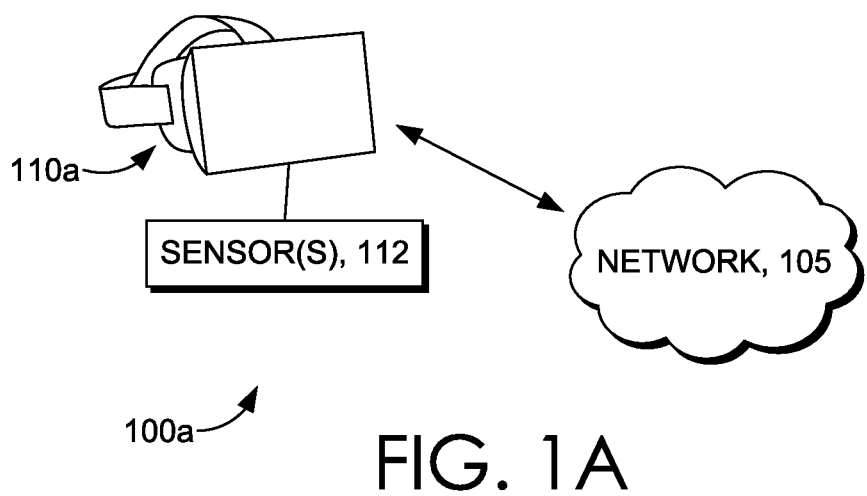
FIGS. 1A-1B are each block diagrams illustrating an exemplary environment, in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

As used herein, the term "monoscopic" refers to an image, frame, or video recorded from one single point of view.

The term "stereoscopic" refers to an image, frame, or video recorded from two points of view, typically a separate recording corresponding to each of a left and right eye.

The term "novel viewpoint" refers to a new image or frame that depicts a new perspective or view of a scene that was not included in the as-recorded source.

The term "six-degree of freedom" or "6-DOF" refers to the freedom of movement of a rigid body in three-dimensional space. In other words, a viewer's body having 6-DOF in a virtual environment is free to move forward, backward, up, down, left, right, and can also rotate about three perpendicular axes.

The term "subject scene" refers to the physical environment that is captured by a recorded media, such as an image, frame, or video. The subject scene can include any and all environmental objects captured by the recording. For instance, a sunset, sunrise, trees, ground, grass, live and inanimate objects, sky, buildings, and the like, can all be part of a subject scene.

The term "camera motion path" refers to a set of information that describes a position, orientation, and/or other movement characteristics associated with a capture device (e.g., a monoscopic 360-degree video camera) in accordance with each frame of a video recorded by the capture device.

The term "sparse three-dimensional geometric representation" refers to a high level, low-detailed three-dimensional model that defines the general framework of a recorded scene. The sparse three-dimensional geometric representation is recovered from a recorded video by identifying and tracking common feature points (e.g., reference pixels) among multiple frames of the video.

The term "dense three-dimensional geometric representation" refers to a low level, highly-detailed three-dimensional model that defines a model representation of a recorded scene. The dense three-dimensional geometric representation represents an accurate 3D model of the scene, where if traversed through in accordance with the original camera motion path, would provide the exact same output as the recorded media.

Virtual reality (VR) devices, such as head-mounted displays, have opened the door to a new means of media consumption. VR devices oftentimes include sensors that can determine a media content viewer's orientation and translational movements. In this way, a viewer can view the content (e.g., a 360-degree video or image) from various perspectives, based on his or her detected movements. Typically, this variable perspective feature is facilitated by displaying the content stereoscopically, such that each of the viewer's eyes sees images or frames of a scene from slightly different perspectives. This difference in perspective provides an illusion of depth to the images or frames, providing a more realistic perception of realism and immersion.

In some instances, a 360-degree video can be stereoscopically recorded from multiple positions around a subject scene (e.g., utilizing camera arrays or light field cameras). That is, the entire subject scene is recorded or created from every position at which the viewer may potentially view the scene. Viewing these types of videos through a VR device provides for the most immersive experience. The VR device can detect the viewer's orientation and translational movements, together also referred to herein as movements in six-degree of freedom or "6-DOF". However, the process for creating such content is extremely time-consuming, requires expensive equipment, utilizes intensive computing resources, and is typically done in a professional setting.

In some other instances, a 360-degree video can be recorded or created stereoscopically from a stereoscopic 360-degree recording device's perspective. That is, a scene is recorded or created from a single position, and this position is the position at which the viewer may view the scene. By way of example, a skier having a stereoscopic 360-degree video camera strapped to the top of her helmet can record a stereoscopic 360-degree video as she traverses down a mountain. The video can later be viewed via a VR device, such that the viewer can visually (and sometimes audibly) experience the skier's trip down the mountain from the position of the 360-degree camera. The stereoscopic 360-degree video and VR device can enable the viewer to change their viewing perspective substantially around a 360-degree range of motion while having some depth perception as a result of the stereoscopic recording. However, because the video camera was fixed to a particular position and the video data was not recorded from multiple positions, translational movements of the viewer detected by the head-mounted device are ignored, which can sometimes lead to viewer confusion and motion sickness.

Stereoscopic 360-degree video recording devices can be expensive, and are not always best-suited for the novice filmmaker. A popular consumer form-factor, on the other hand, is the monoscopic 360-degree video camera. The monoscopic 360-degree video camera is relatively inexpensive, and can typically record a subject scene in a flat, equi-rectangular spherical video. When viewed from a virtual reality headset, one may analogize the viewing experience as sitting inside of a globe and viewing the video along the inner surface thereof. While still providing the viewer with a novel experience and enabling the viewer to view the entirety of the scene based on detected head orientation, the viewer's position within the scene is still fixed (e.g., he may feel stuck at the center), and the lack of depth due to the monoscopic recording can further take away from the immersive viewing experience.

Research has been conducted to discover techniques for re-rendering recorded footage from novel viewpoints. In other words, researchers are trying to find ways to manipulate video footage so that viewpoints from different perspectives and positions are available for viewing. Many of these approaches utilize expensive and pre-calibrated capture stages to reconstruct highly-detailed and textured 3D reconstructions of a subject scene, and directly render its geometry from desired novel viewpoints. These techniques are highly resource-intensive, and require a significant amount of time to produce and render the novel viewpoints. In essence, these traditional techniques focus on accurate and detailed 3D reconstruction to produce high-quality synthesized views. The described techniques, however, are dependent on high-quality footage. In the event that these techniques are performed on novice-level footage, such as footage recorded on a monoscopic 360-degree video camera, there is a high likelihood that the 3D reconstructions will be imperfect (e.g., incomplete and full of noise).

Due to the high likelihood that there will be a demand for this technology for the average consumer, who most likely obtains novice-level footage recorded on a monoscopic 360-degree video camera, it would be desirable to provide techniques for providing novel views in a more efficient and less resource-intensive manner. In this regard, embodiments of the present disclosure are generally directed to generating, or in other words, "synthesizing" novel views in real-time, utilizing imperfect reconstructions and detected motion(s) merely as guidance mechanisms. In this way, processing requirements can remain conservative, and novel viewpoints can be synthesized in real-time, such that the ability to provide an immersive virtual reality experience from monoscopic 360-degree videos to the masses is made a reality.

By analyzing a monoscopic 360-degree video of a subject scene, a high-level (hereinafter referred to as "sparse")

three-dimensional geometric representation of the subject scene and a camera motion path that are associated with the video can be recovered. The recovered sparse three-dimensional geometric representation of the subject scene and camera motion path can then be processed to generate a detailed (hereinafter referred to as "dense") three-dimensional representation of the scene. Utilizing the dense three-dimensional representation and the recovered camera motion path, a rendition of the video can be provided (e.g., streamed) for display. When the rendition of the video is provided for display via a device, such as a head-mounted display, the viewer's physical orientation and translational movements can be tracked. The viewer's tracked movement(s) can then be utilized to warp at least a portion of a provided frame of the rendition, thereby synthesizing novel viewpoints of the scene in real-time based on detected user movement(s).

Figure 1B:
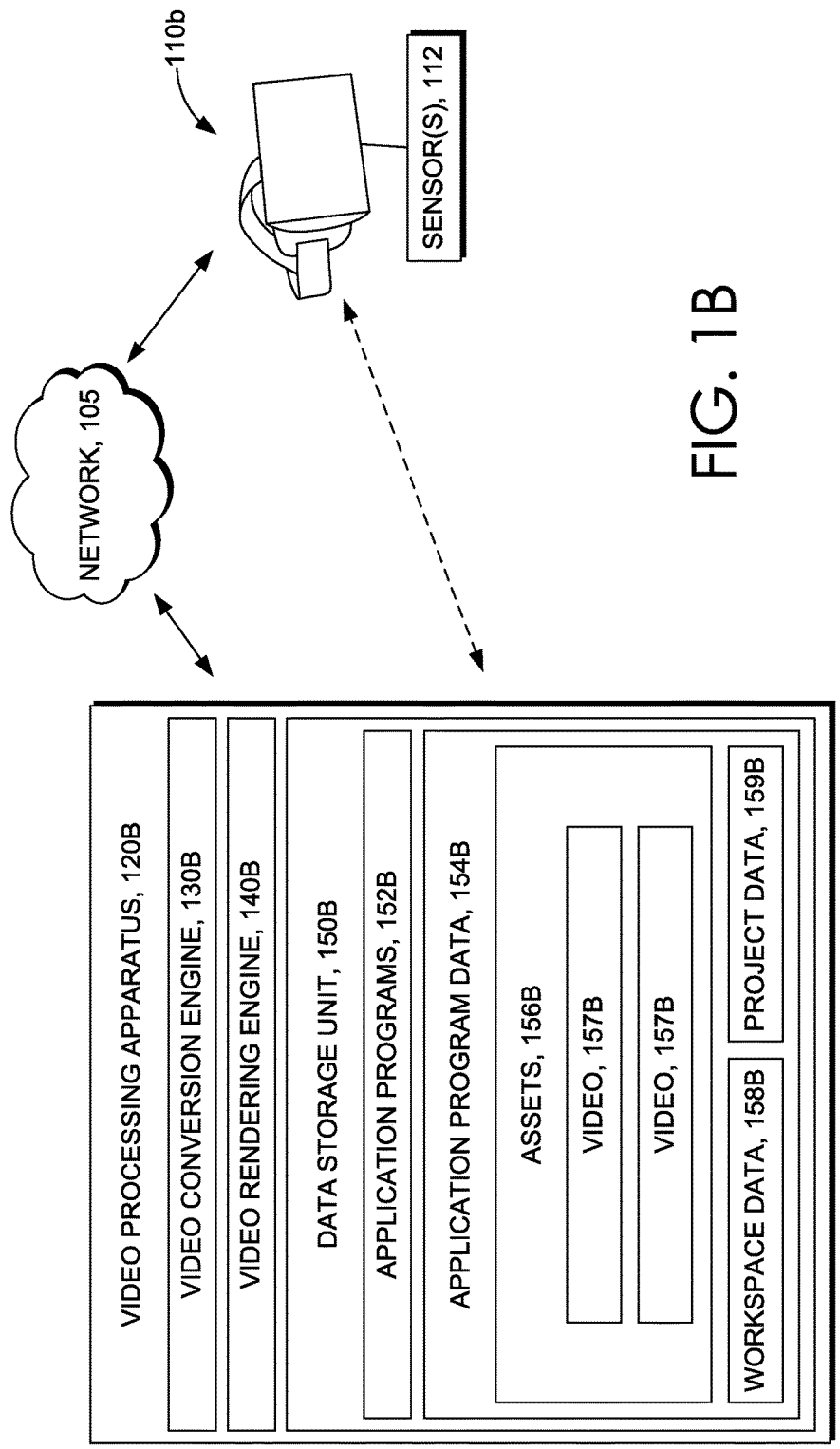

Turning now to FIGS. 1A-1B, FIG. 1A-1B are diagrams of an environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The environments 100A and 100B include one or more user devices, such as a user device 110A, 110B, and/or 120B. In some embodiments, the user device 110A can be a standalone device, comprising both a viewing apparatus 110A and a video processing apparatus, as will be described. The user device 110A, in such embodiments, can be portable and untethered, such that the viewing apparatus 110A can be utilized for media consumption and processing. In some embodiments, the user device 110A can be in communication with the network 105.

In some other embodiments, the user device 110B can be a viewing apparatus coupled to a video processing apparatus 120B via electronic connection(s) or via a network 105. A user of the user device can employ various products, applications, or services supported by the video processing apparatus 120B directly thereon and/or via the network 105. Examples of the network 105 include, but are not limited to, internet, local area network (LAN), wireless area network, wired area network, wide area network, and the like. Examples of the user devices include, but are not limited to, a personal computer (PC), tablet computer, a desktop computer, a head-mounted display, a stereoscopic viewing device, a processing unit, any combination of these devices, or any other suitable device having one or more processors. Each user device can include at least one application supported by the video processing apparatus 120B.

It is to be appreciated that following description is now explained using the user 110B as an example, as any other user device can be used. The viewing apparatus 110B includes a display for providing one or more virtual experiences to the user. The viewing apparatus 110B can be housed in a head-mounted device, and can include one or more displays. In some embodiments, a single display is provided, and the provided image is split into two different renderings such that each of the user's eyes can view images having slightly varying perspectives. In some other embodiments, two displays are provided, such that each displays a unique image having slight variation in renderings to compensate for the variable viewing perspectives. The viewing apparatus 110B can include or house a head-mounted display. In some embodiments, the viewing apparatus 110B can simply house another user device, such as a smart phone. The viewing apparatus 110B can also include sensors 112 that can detect the user's motion. More specifically, the viewing apparatus 110B can comprise motion detecting sensors 112, which can include any one or more of an accelerometer, gyroscope, magnetometer, infrared blaster and/or detector, light sensors, and the like, by way of example only. These sensors 112 can detect and track the relative orientation and translational movements (i.e., user motion) of the user wearing the viewing apparatus 110B. In other words, the sensors 112 can track motion of the viewing apparatus 110B (and thereby the wearing user) in six degrees of movement, including forward, back, up, down, left, right, pitch, yaw, and roll. In embodiments, the viewing apparatus 110B can communicate the detected user motion to a video processing apparatus, such as video processing apparatus 120B. The video processing apparatus 120B can then communicate a video signal to the viewing apparatus 110B, to provide for display an asset rendered by the video processing apparatus 120B.

The video processing apparatus 120B can include one or more engines for providing one or more digital experiences to the user. The video processing apparatus 120B can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The video processing apparatus 120B also includes a data storage unit 130B. The data storage unit 130B can be implemented as one or more databases or one or more data servers. The data storage unit 130B includes data that is used by the engines of the video processing apparatus 120B.

A user of the user device 110B can access an application(s) supported by the video processing apparatus 120B. The video processing apparatus 120B can provide the application(s) as a software as a service (SaaS), or as a standalone application that can be installed and/or accessed via the user device 110B, or as a combination. The video processing apparatus 120B can generate, from a monoscopic 360-degree video, a stereoscopic, three-dimensional rendition of the video. The user device 110 or another user device (not shown) can provide the video processing apparatus 120B with an asset for processing, such as the monoscopic 360-degree video. The asset is received by the video conversion engine 130B and stored as application program data 154B in data storage unit 150B. The video conversion engine 130B can then analyze and process the asset to recover a camera motion path from the video, and generate a detailed three-dimensional geometric representation of the subject scene, which can also be stored as application program data 154B.

Once the camera motion path is recovered and the detailed three-dimensional geometric representation of the scene is generated, the processed video is ready to be viewed with six-degrees-of-freedom by the user or shared to another user or device. In order to view the processed video, it can be communicated to a video rendering engine, such as video rendering engine 140B. In embodiments, the video rendering engine 140B can render frames or images of the processed video to a user device, such as user device 110B, based on detected motion data received from user device 110B. In essence, the processed video will be played on the user device 110B, each frame having reference camera orientation and translation values that were recovered with the camera motion path. The detected motion data from the user device 110B, which includes a desired camera orientation and translation value, can be processed by the video rendering engine 140B to compute parameters for warping the current frame to display the desired frame. In some embodiments, the video rendering engine 140B can be implemented within a graphical processing unit (GPU), to increase the rendering speed and provide a more realistic, real-time viewing experience to the user.

In some embodiments, the user can utilize one or more application programs 152B to create one or more projects or assets. In addition, the user can also have a workspace within each application program. The workspace, as described herein, includes setting of the application program, setting of tools or setting of user interface provided by the application program, and any other setting or properties specific to the application program. Each user can have a workspace. The workspace, the projects or the assets can then be stored as application program data 154B in the data storage unit 150B.

The application program data 154B can include one or more assets 156B. The assets 156B can be a shared asset which the user wants to utilize, view, share with other users, or offer on a marketplace. The assets 156B can also be shared across multiple application programs 152B. Each asset can include metadata (not shown). Examples of the metadata include, but are not limited to, font, color, size, shape, coordinate, a combination of any of these, and the like. In addition, in one embodiment, each asset also includes a file. Examples of the file include, but are not limited to, an image, text, a video 157B, a font, a document, any combination of any of these, and the like.

The application program data 154b can also include project data 159B and workspace data 158B. In one embodiment, the project data 159B includes the assets 156B. In another embodiment, the assets 156B are standalone assets. Similarly, the workspace data 158B can be part of the project data 159B in one embodiment while it may be standalone data in another embodiment.

It is to be appreciated that the engines and working of the engines are described as examples herein and the engines can be used for performing any step in providing an immersive virtual reality experience to the user.

Figure 2:
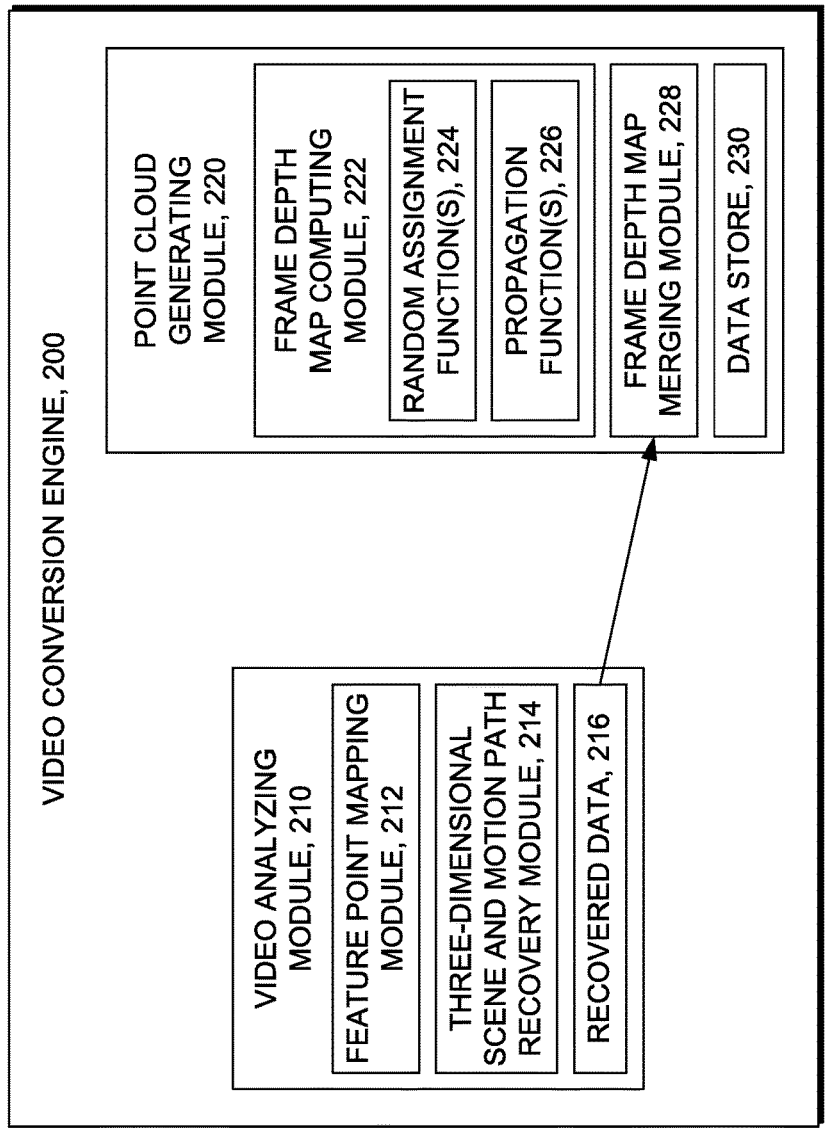
FIG. 2 is a block diagram illustrating an exemplary video conversion engine, in accordance with implementations of the present disclosure.

With reference now to FIG. 2, a block diagram illustrating a video conversion engine 200 for recovering data from a monoscopic 360-degree video, as well as generating a three-dimensional point cloud representation (also referred to herein as a detailed three-dimensional geometric representation) of the subject scene from the video, is provided in accordance with some implementations of the present disclosure. The video conversion engine 200 can be implemented in a video processing apparatus, such as video processing apparatus 120B of FIG. 1B, or any other computing device in communication with a user device, such as user device 110B of FIG. 1B.

The video conversion engine 200 can analyze a monoscopic 360-degree video, with video analyzing module 210, to recover a sparse three-dimensional geometric representation of a subject scene, and a camera motion path associated with the video. In essence, the video analyzing module 210 can generate a high-level 3D geometric representation of the recorded scene, and a path that the camera traversed through the scene as the video was recorded, utilizing information extracted from each frame of the recorded video. In embodiments, the subject scene can be, for instance, the visible scene that was recorded or created (e.g., via computer rendering) in the video. The camera motion path can be, for instance, a representation of the various physical position(s), orientation(s), and/or translational movement(s) that the camera was in as the video was recorded or created.

In accordance with some implementations of the video conversion engine 200, the video analyzing module 210 can include a feature point mapping module 212 for identifying feature points from the video, a three-dimensional scene and motion path recovery module 214 for recovering the sparse three-dimensional geometric representation and camera motion path associated with the video, and a cache and/or memory for storing the recovered data 216. The data 216, once recovered, can then be communicated from the video analyzing module 210 to the point cloud generating module 220, as will be described.

In embodiments, the three-dimensional scene and motion path recovery module 214 can be configured to recover the sparse three-dimensional geometric representation and camera motion path from a monoscopic 360-degree video. The three-dimensional scene and motion path recovery module 214 can employ a structure-from-motion (SfM) algorithm to analyze the video and recover the geometric representation and camera motion path. Additional details regarding the SfM algorithm can be found in a publication by R. I. Hartley and A. Zisserman, entitled "*Multiple View Geometry in Computer Vision*," Hartley and Zisserman, Cambridge University Press, ISBN: 0521540518, second edition, 2004, which is incorporated in reference by its entirety herein.

Figure 3:
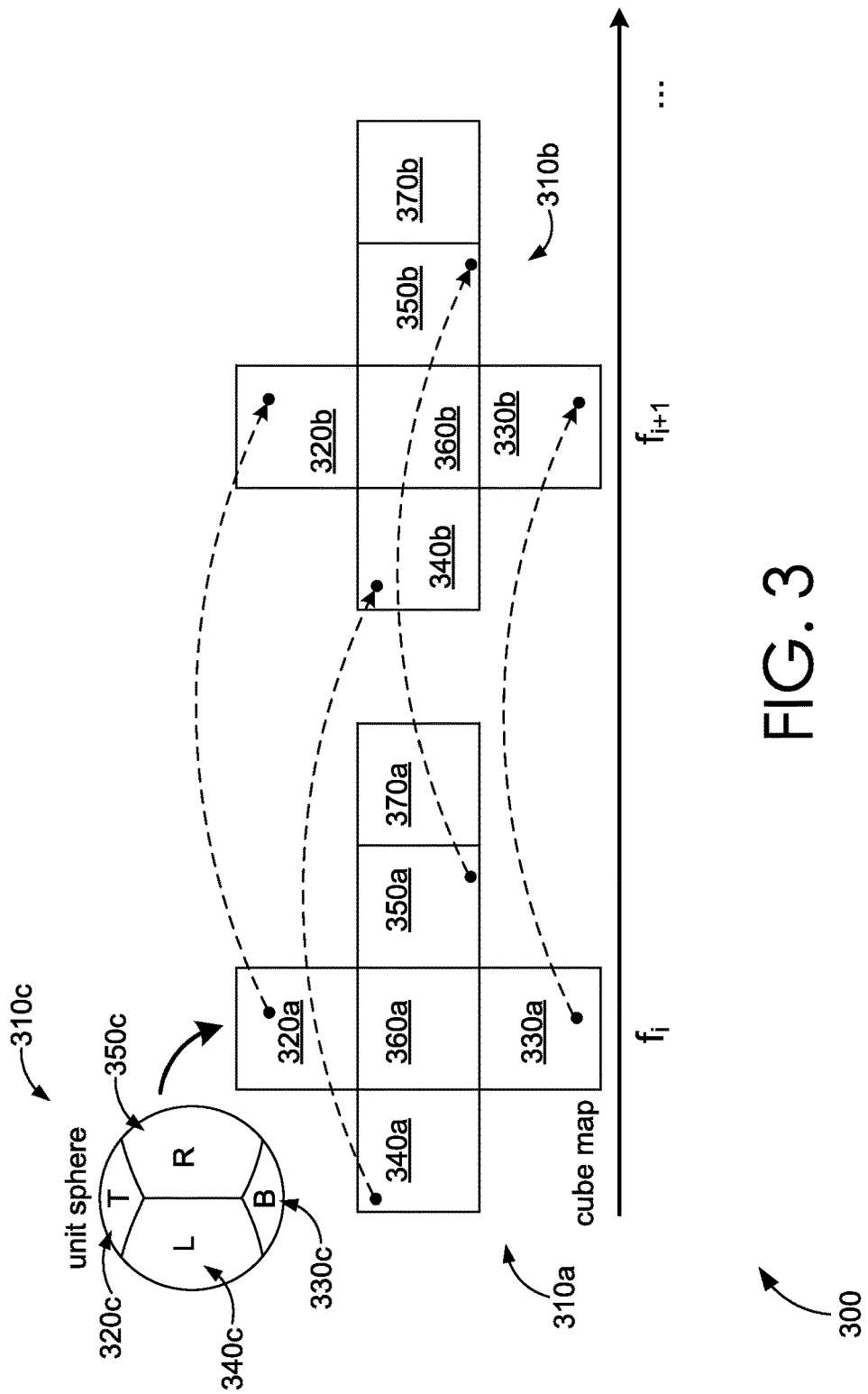
FIG. 3 is an illustration of a unit sphere and a cube map for demonstrating some functional aspects of a feature point mapping module, in accordance with implementations of the present disclosure.

The input to a standard SfM algorithm is a set of feature points that are tracked among multiple images (e.g., multiple video frames of the monoscopic 360-degree video). Each track can include a set of image points, which are believed to be a projection of the same 3D point. The SfM algorithm can recover a position of each 3D point as well as the camera motion path (also referred to herein as "camera parameters") of each image observing these points. However, in order for the three-dimensional scene and motion path recovery module 214 to receive the set of feature points for processing, the feature point mapping module 212 must first track feature points in a panoramic video, such as the monoscopic 360-degree video. The feature point mapping module 212 can map every frame of the video (each frame being a panoramic image) onto six planes 320a-370a of a cube map 310a, as illustrated in FIG. 3. With reference to FIG. 3, for each consecutive frame of the video ($f_i$ and $f_{i+1}$), the feature point mapping module 212 maps unit spheres 310c (comprising reference areas 320c-350c) of corresponding cameras to a cube map, such as cube maps 310a or 310b, and performs feature tracking on each of the six image planes of the cube in parallel. To track feature points, the feature point mapping module 212 can identify a set of image points among a plurality of frames, which are believed to be a projection of the same 3D point. That is, any reference point in an image or frame (e.g., a particular pixel) that occurs in multiple images or frames, a feature point can be mapped thereon.

Looking back now to FIG. 2, the feature point mapping module 212 can now execute a standard KLT tracker algorithm on each of the six image planes. Additional details regarding the KLT tracker algorithm can be found in "*An iterative image registration technique with an application to stereo vision*," B. D. Lucas and T. Kanade, Int. Joint Conf. on Artificial Intelligence—Volume 2, pages 674-679, 1981, and "*Detection and tracking of point features,*" C. Tomasi and T. Kanade, IJCV, 1991, which are incorporated in reference by their entirety herein. As an independent tracking of feature points on each of these image planes can potentially lead to artifacts due to feature points detected at the boundary of the faces of the cube, such points are likely to be mapped to different faces of the cube at consecutive frames resulting in a tracking failure. To address this issue, when mapping each frame of the video to a cube map, the feature point mapping module 212 utilizes a field-of-view (FOV) greater than 45-degrees (for instance, 48-degrees) to generate overlapping regions between image planes corresponding to neighboring faces of the cube. Once the feature point mapping module 212 completes the feature tracking on the six images of the current frame, each feature that is tracked in the overlapping region is assigned back to the original image plane to which it corresponds. As a result, the feature point mapping module 212 can safely track feature points that are close to the edges of the cube as long as camera motion between successive frames is not large.

Once the feature point mapping module 212 tracks a set of feature points across a desired duration of the video, the feature point mapping module 212 provides the tracked feature point sets to the three-dimensional scene and motion path recovery module 214. The three-dimensional scene and motion path recovery module 214 can now process this information, utilizing the SfM algorithm, to recover the sparse three-dimensional geometric representation of the scene and the camera parameters for each frame. As the duration of a video can be arbitrarily long, the three-dimensional scene and motion path recovery module 214 can first run SfM on a set of key frames (e.g., every 12th frame).

In some embodiments, the three-dimensional scene and motion path recovery module 214 can employ an incremental approach for recovering the camera parameters of each key frame, where the camera of the next key frame is initialized with the camera parameters of the previous key frame. In essence, the camera projection matrix of the first key frame can be initialized as the identity matrix. The three-dimensional scene and motion path recovery module 214 can then refine this initial camera guess by minimizing the re-projection error of the already reconstructed 3D points onto the new key frame. Finally, at each step of this incremental approach, the three-dimensional scene and motion path recovery module 214 can execute a bundle adjustment step to optimize both for the positions of the 3D points tracked thus far, and also the camera parameters of all of the current key frames. In embodiments, the camera parameters can include the orientation, position, and/or other characteristics of the camera for each key frame.

After the orientation and position of the camera for each key frame is determined by the three-dimensional scene and motion path recovery module 214, the three-dimensional scene and motion path recovery module 214 can initialize the cameras of the in-between frames with a linear interpolation between the camera parameters of the neighboring key frames. It is contemplated that in some embodiments, the three-dimensional scene and motion path recovery module 214 can interpolate the translation and the quaternion representation of the rotation of the camera independently. Similar to the case of key frames, the three-dimensional scene and motion path recovery module 214 can first refine these initial camera guesses by minimizing the re-projection error of the reconstructed sparse 3D point cloud onto the in-between frames. The three-dimensional scene and motion path recovery module 214 can then perform one final bundle adjustment step to further refine the camera parameters of each frame, including both key frames and in-between frames, and the position of the sparse 3D points corresponding to the feature tracks. Finally, given n-number of 3D points and m-number of frames, the three-dimensional scene and motion path recovery module's 214 bundle adjustment step can refine the 3D position of each point $p_i$ and the camera parameters of each frame $c_j$ such that the re-projection error is minimized:

$$\min_{p_i, c_j} \sum_1^n \sum_1^m v_{ij}(\rho(p_i, c_j) - x_{ij})^2$$

In more detail, $\rho$ denotes the projection of a 3D point onto the unit sphere of a camera, while $v_{ij}$ is a binary variable to indicate whether the 3D point $p_i$ is tracked in frame j, and if so $x_{ij}$ denotes the position of the corresponding feature point on the unit sphere of frame j. Measuring the re-projection error directly on the unit sphere instead of the panorama image can lead to more accurate results as it avoids the additional distortions caused by the projection from the sphere to the image space. To this end, once the three-dimensional scene and motion path recovery module's 214 completes recovery of the sparse three-dimensional geometric representation of the scene and the camera motion path, the results can be saved as recovered data 216 and communicated to point cloud generating module 220.

In accordance with some implementations of the video conversion engine 200, the point cloud generating module 220 can include a frame depth map computing module 222 for computing a depth map for each frame of the video by iteratively performing random assignment and propagation function(s), a frame depth map merging module 228 for mapping each 3D point recovered by the three-dimensional scene and motion path recovery module 214 onto a unit sphere of each frame to generate a dense three-dimensional geometric representation of the scene, and a data store 230 for storing, among other things, the dense three-dimensional geometric representation of the scene, as will be described.

In embodiments, the frame depth map computing module 222 can be configured to compute a depth map for each frame of the video by performing random assignment function(s) 224 and propagation function(s) 226. In accordance with some implementations described herein, the frame depth map computing module 222 employs the 3D reconstruction method described in "*Accurate multiple view 3D reconstruction using patch-based stereo for large-scale scenes,*" S. Shen, IEEE transactions on image processing, 22(5):1901-1914, 2013, which is incorporated by reference in its entirety. The frame depth map computing module 222 can initialize a depth map for each frame of the video, utilizing the sparse three-dimensional geometric representation of the scene obtained from recovered data 216. More specifically, the frame depth map computing module 222 maps each recovered three-dimensional point of the sparse three-dimensional geometric representation of the scene onto a unit sphere of each frame as vertices, and then performs Delaunay Triangulation thereon. The frame depth map computing module 222 can obtain the depth value for each point inside a triangle by linearly interpolating the depth values of its vertices. The frame depth map computing module 222 can obtain per-pixel depth values by rasterizing the triangulation on the sphere onto the panorama image (e.g., the corresponding frame of the monoscopic 360-degree video).

The frame depth map computing module 222 executes a propagation function 226 to refine the depth value of each pixel via the depth of its neighbors, such that a matching cost is minimized. The frame depth map computing module 222 employs the matching cost to evaluate the normalized cross correlation (NCC) score of a local window centered around a pixel in a reference image and its corresponding pixel in a neighboring image. For standard perspective images, this window is simply defined as a square aligned with the image axes. In this case, however, this local window is defined directly onto the unit sphere to uniformly capture the neighborhood of a point irrespective of its location on the sphere.

Figure 4:
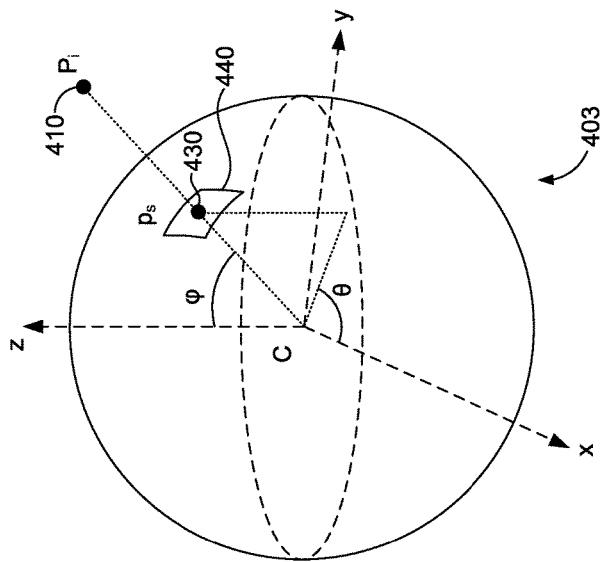
FIG. 4 is an illustration of a panorama image and a unit sphere for demonstrating some functional aspects of a frame depth map computing module, in accordance with implementations of the present disclosure.
Figure 4:
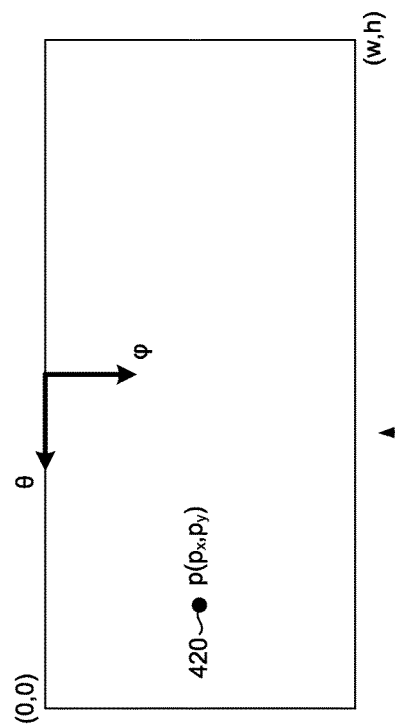

By way of more detail, with reference now to FIG. 4, a 3D point $P_i$ 410 projects to the pixel $p(p_x, p_y)$ 420 in the (w×h) panorama image 402 and the point $p_s(\cos\Theta \sin\Phi; \sin\Theta \sin\Phi; \cos\Phi)$ 430 on the unit sphere 403 where $\Theta=2\pi p_x/w$ and $\Phi=\pi p_y/h$. When computing the matching cost of this point 410 with neighboring views, the frame depth map computing module 222 defines a local patch 440 around $p_s$ on the unit sphere with axes directions $(-\sin\Theta, \cos\Theta, 0)$ and $(-\cos\Theta \cos\Phi, -\sin\Theta \cos\Phi, \sin\Phi)$.

In embodiments, the frame depth map merging module 228 can be configured to merge each of the per-frame depth maps, computed by the frame depth map computing module 222, into a single 3D point cloud representation (i.e., the dense three-dimensional geometric representation) of the scene. Once the per-frame depth maps are computed, the frame depth map merging module 228 can merge them into a single 3D point cloud representation of the scene. During this merge step, the frame depth map merging module 228 can filter out the points that incur a high matching cost and do not obey the visibility constraints, to reduce the noise and outliers in the final 3D scene geometry. Upon finalized the merge, the frame depth map merging module 228 can store the dense three-dimensional geometric representation of the scene into data store 230. In accordance with embodiments described herein, the aforementioned steps performed by the video conversion engine 200 can be referred to as a preprocessing step. In other words, the monoscopic 360-degree video is preprocessed by the video conversion engine 200 so that the video rendering engine 500 can provide the video with a virtual viewing experience supporting six-degree-of-freedom movements.

Figure 5:
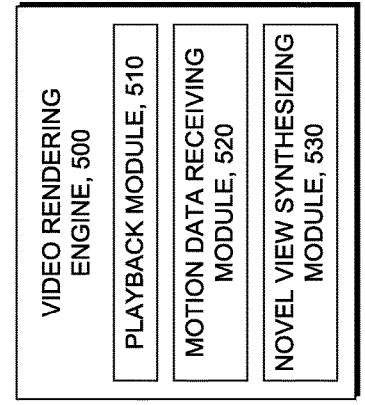
FIG. 5 is a block diagram illustrating video rendering engine, in accordance with implementations of the present disclosure.

With reference now to FIG. 5, a block diagram is provided, illustrating a video rendering engine 500 for rendering images or frames of the preprocessed video based on motion data obtained from sensors, such as sensor(s) 112 of FIG. 1. As described, the video rendering engine 500 can receive detected motion data from a user device, such as a head mounted display, and utilize the motion data to determine orientation and/or translational movements (e.g., in six-degrees-of-freedom) of a user. In this way, the video rendering engine 500 can determine a desired camera orientation and translation (i.e., a novel viewpoint) based on the obtained motion data, and warp one or more frames of the video to synthesize or render the novel viewpoint for display to the user. The video rendering engine 500 can be implemented in a video processing apparatus, such as video processing apparatus 120B of FIG. 1B, or any other computing device in accordance with FIG. 9 in communication with a user device, such as user device 110B of FIG. 1B. In some embodiments, the video rendering engine 500 can be implemented within a graphical processing unit (GPU) of the video processing apparatus or user device, to increase the synthesizing speed and provide a more realistic, real-time viewing experience to the user.

In some embodiments, the video rendering engine 500 can include a playback module 510 for stereoscopically rendering the preprocessed video for display, a motion data receiving module 520 for receiving motion data detected by sensor(s) of a user device that is configured to receive and display the rendered video, and a novel view synthesizing module 530 for warping one or more frames of the video based on the motion data to provide the desired novel viewpoint.

The video rendering engine 500 can stereoscopically render the preprocessed video, with playback module 510, via a user device such as a head-mounted display. In essence, the playback module 510 can employ the dense three-dimensional geometric representation of the subject scene (for instance, from data store 230 of FIG. 2) and the recovered camera motion path (for instance, from recovered data 216 of FIG. 2) to provide for display the preprocessed video from two unique perspectives aligned with each of the viewing user's eyes. These unique viewing perspectives will be referenced herein as "cameras," which would have been employed to stereoscopically record the video. Instead of providing the depth-lacking two-dimensional video footage (i.e., the monoscopic 360-degree video), the playback module 510 can traverse through the generated dense three-dimensional geometric representation, guided by the recovered camera motion path, to render the preprocessed video. As will be described, the playback module 510 can receive rendering information from the novel view synthesizing module 530 to provide for display each of the unique camera views.

In accordance with some implementations of the video rendering engine 500, the video rendering engine 500 can also include a motion data receiving module 520 for obtaining detected motion data from one or more sensors, such as sensor(s) 120 of FIG. 1B. In various embodiments, the motion data receiving module 520 can be in communication with sensor(s) of a user device, such as a head-mounted display. The motion data, as described herein, can include detected orientation and translation of an associated user device, typically worn by a user. As one of ordinary skill in the art may appreciate, such devices are worn on the head of the user, so that the user's head motions and translational movements can be detected and utilized to modify the user's viewing perspectives in real time.

In accordance with further implementations of the video rendering engine 500, the video rendering engine 500 can also include a novel view synthesizing module 530 for transforming each frame of the video (e.g., the monoscopic 360-degree video) to conform with detection motion data. In other words, as motion data is received from the motion data receiving module 520, the motion data is communicated to the novel view synthesizing module 530 so that a currently playing image or "renderable" frame of the video is transformed or "warped" based on the obtained motion data.

Figure 6:
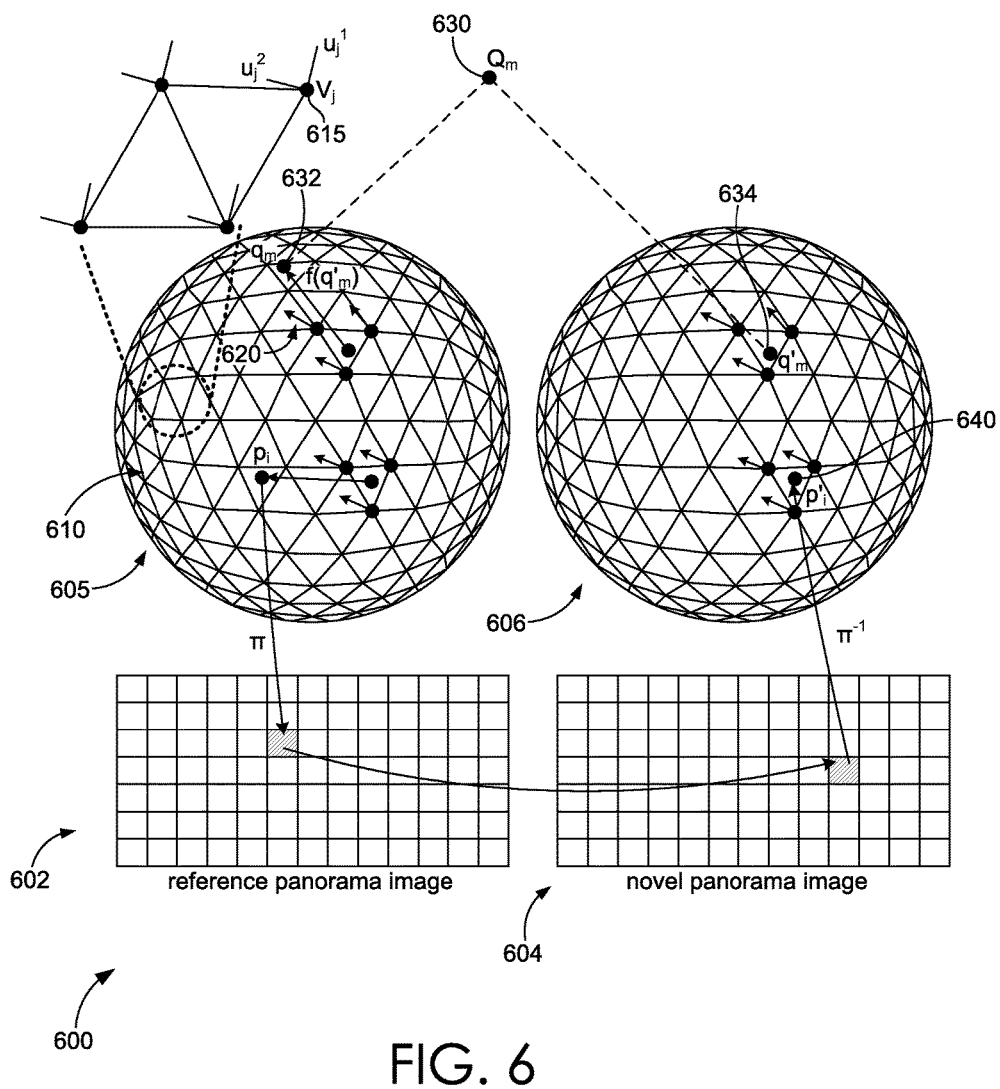
FIG. 6 is an illustration of a reference panorama image, novel panorama image, and corresponding unit spheres for demonstrating some functional aspects of a novel view synthesizing module, in accordance with implementations of the present disclosure.

In accordance with some embodiments, with reference now to FIGS. 5 and 6, the novel view synthesizing module 530 can warp images or frames, such as reference panorama image 602, guided by a control triangular mesh "G" 610 defined on a unit sphere 605 by icosahedron tessellation, as illustrated on FIG. 6. When warping a current frame 602 to synthesize a novel view 604, embodiments of the present disclosure can be implemented such that the motion of this control mesh 610 well-represents the relative motion between the cameras, while being smooth to avoid distortions. Furthermore, the novel view synthesizing module 530 can ensure that each vertex, such as vertex 615, of the control mesh moves only on the surface of the sphere 605.

With reference now to FIGS. 5 and 6, the novel view synthesizing module 530 can accomplish this by defining a conjugate direction field, such as conjugate direction field 620, on "G" 610 so that the motion of each vertex $V_j \in G$ is defined by two tangential vectors $u_j^1$ and $u_j^2$: $f(V_j) = a_j u_j^1 + b_j u_j^2$. In some embodiments, the novel view synthesizing module 530 can compute the control mesh 610 and the conjugate direction field once for a unit sphere, which is shared across all frames.

Given a reference current frame 602 with camera orientation and translation (R, t) and a desired novel viewpoint 604 with orientation and translation (R', t'), the goal of the novel view synthesizing module 530 is to compute the parameters $\{a_j, b_j\}$ that warp the current frame 602 to the desired frame 604. The novel view synthesizing module 530 sets up an optimization that minimizes an energy function composed of data and regularization terms to compute this warping. While the data term ensures that the warping accurately captures the relative motion between the views, the regularization term helps to avoid distortions.

Given the dense three-dimensional geometric representation of the captured scene, the novel view synthesizing module 530 projects each 3D point $Q_m$ 630 to the unit spheres 605, 606 corresponding to the reference 602 and the desired frames 604 to obtain the projections $q_m$ 632 and $q'_m$ 634, respectively. Each such projected point falls inside a triangle of the control mesh 610. The novel view synthesizing module 530 denotes the triangle that contains $q'_m$ by $t(q'_m)$, and the indices of the vertices of this triangle as $t(q'_m, 0)$, $t(q'_m, 1)$, and $t(q'_m, 2)$, respectively. As the novel view synthesizing module 530 warps the current frame 602, the movement of any projected point $q'_m$ is defined as a linear combination of the movement of the vertices of its covering triangle:

$$f(q'_m) = \Sigma_{k \in \{0,1,2\}} w_{k,m} f(V_{t(q'_m,k)})$$

where $w_{k,m}$ denotes the barycentric coordinates of the point. The data term $E_d$ forces to move each point $q'_m$ in the desired frame 604 to its corresponding position $q_m$ in the reference frame 602.

Looking again at FIG. 6, the warp is applied to the current reference image 602 guided by a control mesh 610 defined on the unit sphere 605. The warping moves the projection of each three-dimensional scene point $Q_m$ in the new frame ($q'_m$) to its corresponding projection point in the reference frame ($q_m$). This movement, $f(q'_m)$ is defined by the movement of the vertices of the triangle the point belongs to. Moreover, each triangle vertex $V_j$ is moved by its conjugate vectors $u_j^1$ and $u_j^2$ such that it is constrained to move only on the surface of the sphere. The novel view synthesizing module 530 utilizes the computed warping field to map each pixel in the novel panorama image to its corresponding pixel in the reference frame to transfer the color information.

The equations provided here are implemented by the novel view synthesizing module 530, in accordance with some embodiments described herein. It is contemplated that other equations may be employed to facilitate a similar result.

$$E_d = \sum_{q'_m} \|q'_m + f(q'_m) - q_m\|^2$$
$$= \sum_{q'_m} \|q'_m + \sum_{k \in \{0,1,2\}} w_{k,m} f(V_{t(q'_m,k)}) - q_m\|^2.$$

Here, the regularization term $E_r$ enforces each pair of vertices connected by an edge $e(V_i, V_j) \in G$ to move similarly, to avoid distortions:

$$E_r = \sum_{e(V_i, V_j) \in G} \|(a_i u_i^1 + b_i u_i^2) - (a_j u_j^1 + b_j u_i^2)\|^2$$
$$= \sum_{e(V_i, V_j) \in G} \|(a_i u_i^1 + b_i u_i^2) - (a_j u_j^1 + b_j u_j^2)\|^2.$$

To this end, the novel view synthesizing module 530 can combine the data and regularization terms, and optimize for the warping parameters $\{a_j, b_j\}$ that minimizes the resulting energy:

$$\min_{\{a_j, b_j\}} E_d + \lambda E_r$$

where $\lambda$ denotes the relative weighting of the two terms (by way of example, the relative weighting can be set to a value of 50).

Once the warping parameters are computed by the novel view synthesizing module 530, the novel view synthesizing module 530 utilizes the computed parameters to synthesize the new desired frame 604. More specifically, for each pixel in the desired panorama image 604, the novel view synthesizing module 530 maps the desired panorama image 604 onto the unit sphere of the desired frame 606 via inverse spherical projection ($\pi^{-1}$) to obtain the point $p'_i$ 640, as depicted in FIG. 6. In embodiments, the novel view synthesizing module 530 can be implemented to identify the corresponding point on the unit sphere of the reference frame 605.

The novel view synthesizing module 530 can first find the triangle $t(p'_i)$ in the desired frame 606 that $p'_i$ belongs to, and utilize the movement of the vertices of this triangle:

$$\Sigma_{k \in \{0,1,2\}} w_{k,i} f(t(p'_i), k)$$

to obtain the corresponding point:

$$p_i = p'_i + \Sigma_{k \in \{0,1,2\}} w_{k,i} f(t(p'_i), k)$$

in the reference frame. The novel view synthesizing module 530 can then map $p_i$ to the panorama image 602 of the reference frame via spherical projection ($\pi$) and retrieve the color that should be transferred to the desired panorama image 604. As the mapping between a unit sphere and a panorama image is fixed, for each pixel in a panorama image, the novel view synthesizing module 530 can pre-compute the triangle that contains its inverse projection onto the unit sphere and the corresponding barycentric coordinates. While in some embodiments, the novel view synthesizing module 530 may warp the entire panorama image for each frame, it is contemplated that in practice, only a certain region of the image is visible (e.g., to the user) at any given time. Thus, at each frame, in some embodiments, the novel view synthesizing module 530 first identifies the region of interest (e.g., visible to the user) in the panorama image and perform warping only for this region. Experiments prove that this optimization leads to a nearly 35% computational efficiency without any loss in the warping quality.

In accordance with some embodiments, the disclosed technology can be employed as a technique for video stabilization. More specifically, as a camera motion path is recovered, for instance, by a three-dimensional scene and motion path recovery module 214 as illustrated in FIG. 2, the recovered camera motion path can be smoothed (e.g., sharp camera movements are dampened) to remove the shaking motion originally associated with the video. In this way, novel views can still be synthesized in accordance with embodiments described herein, and an improved viewing experience can be provided to the user. Moreover, as six-degrees-of-freedom is supported in accordance with embodiments described herein, it is contemplated that various components of camera motion can be stabilized independently. By way of example only, vertical oscillations may be removed while keeping off-vertical-axis motions if desired. Alternatively, translation of the camera can be re-synthesized with constant speed(s) to remove accelerations that can be known to cause motion sickness.

Further, and in accordance with some other embodiments, instead of continuously updating the camera location during playback (e.g., traversing through the dense three-dimensional geometric representation of the scene via the camera path in accordance with video playback), it is contemplated that some portions of the preprocessed video can be viewed at a fixed viewpoint, so that camera motions that were originally part of the monoscopic 360-degree video remain fixed at a particular position. By way of example, if a particular portion of the unprocessed monoscopic 360-degree video shows a scene where the camera evidently travels forward or backward (e.g., 5 meters) relative to an object, embodiments can be configured to fix a particular point of this camera path (e.g., mid-point), such that the user is constantly viewing the scene from the fixed viewpoint, and the relative travel to or from the object is removed.

With reference now to FIG. 7, a flow diagram is provided that illustrates a method 700 for providing six-degree of freedom viewing of a monoscopic 360-degree video. The method 700 may be performed at least in part, for instance, by the video processing apparatus 120B of FIG. 1B. Each block or step of method 700 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At block 710, a monoscopic 360-degree video of a subject scene is processed, by a processor for instance, to recover a sparse three-dimensional geometric representation of the subject scene and a camera motion path from the video. In other words, a monoscopic 360-degree video can be analyzed to identify a set of feature points tracked among multiple frames of the video. As will be described, the identified set of feature points can be provided as input to an algorithm, such as a structure-from-motion (SfM) algorithm, to recover the camera motion path and sparse three-dimensional geometric representation of the scene.

To identify the set of feature points, each frame of the video can be mapped onto six planes of a cube map, where each plane is processed utilizing a standard KLT tracker algorithm, as described herein. When mapping each frame of the video to a cube map, a field-of-view greater than 45-degrees can be utilized to generate overlapping regions between image plans corresponding to the neighboring faces of the cube. In this way, artifacts due to feature points detected at the boundary of the faces can be mitigated. Once feature tracking is completed on the six images of a current frame, each feature tracked in the overlapping region can be assigned back to the original image plane it corresponds to. In this way, feature points that are close to the cube edges can be appropriately tracked.

After the set of feature points across the entire duration of the video is tracked, the SfM algorithm can be employed to process the sparse three-dimensional geometric representation of the subject scene and the camera parameters for each frame. In some embodiments, the SfM can be employed on a set of key frames (e.g., every $12^{th}$ frame), particularly for arbitrarily long videos. The next key frame for any key frame can be initialized with the camera parameters of the previous key frame. A bundle adjustment step can be performed to optimize the positions of the points tracked, and also the camera parameters of all the current key frames. After orientation and position of the camera for each key frame is determined, the cameras of the in-between frames can be initialized with a linear interpolation between the camera parameters of the neighboring key frames.

At block 720, the recovered sparse three-dimensional geometric representation of the subject scene and the camera parameters for each frame are utilized to generate a dense three-dimensional geometric representation of the subject scene. In essence, a depth map can be computed for each frame by iteratively performing random assignment and propagation operations, as described herein. In embodiments, the depth map of each frame can be initialized utilizing the sparse three-dimensional geometric representation obtained in block 710. More specifically, each recovered three-dimensional point can be mapped onto the unit sphere of each frame as a vertex, and as such, Delaunay Triangulation can be performed thereon. The depth value for each point can be determined, inside a triangle, by linearly interpolating the depth values of its vertices. Per-pixel depth values can also be determined by rasterizing the triangulation on the sphere, back onto the panorama image.

A propagation operation can refine the depth value of each pixel based on the depth of its neighbors, such that a matching cost is minimized. The matching cost can evaluate the normalized cross correlation score of a local window centered around a pixel in a reference image and its corresponding pixel in a neighboring image. For standard perspective images, this window can be defined as a square aligned with the image axes. In some embodiments, this local window can be defined directly on the unit sphere to uniformly capture the neighborhood of a point irrespective of its location on the sphere.

In further embodiments, the set of feature points identified in block 710 can also be filtered, such that those that incur a high matching cost and do not obey visibility constraints are removed. In this way, noise and outliers in the final dense three-dimensional geometric representation of the subject scene can be reduced.

Once the monoscopic 360-degree video is preprocessed in blocks 710 and 720, a new, processed rendition of the video is provided for display at block 730. The processed rendition of the video is a rendering of images, frames, or views, of the dense three-dimensional geometric representation of the subject scene being traversed through in accordance with the recovered camera path. In essence, the processed rendition of the video essentially recreates how the monoscopic 360-degree video traversed the scene at the time of recording, but now virtually through the dense three-dimensional geometric representation of the subject scene. The processed rendition of the video can be provided for display to a user device, such as a head-mounted display operable to stereoscopically display to a user, received video inputs, among other things.

As described, the user device can obtain motion data from a user via one or more sensors that are in communication with a video conversion engine, such as video conversion engine 200 of FIG. 2. As user motion data is detected by the sensors and communicated to the video conversion engine, an image warping of a currently playing frame of the processed rendition of the video can take place. The image warping can be guided by a control triangular mesh defined on a unit sphere by icosahedron tessellation. In accordance with embodiments described herein, provided with a recovered reference current frame with an original camera orientation and translation, and a desired novel viewpoint with detected orientation and translation (e.g., obtained via sensors of a head-mounted display), the current frame can be warped by determined parameters to transform or modify the current frame to the desired frame.

With reference now to FIG. 8, another flow diagram is provided that illustrates a method 800 for providing image stabilized viewing of a monoscopic 360-degree video. The method 800 may be performed at least in part, for instance, by the video processing apparatus 120B of FIG. 1B. Each block or step of method 800 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At block 810, a monoscopic 360-degree video of a subject scene is processed, by a processor for instance, to recover a sparse three-dimensional geometric representation of the subject scene and a camera motion path from the video. In other words, a monoscopic 360-degree video can be analyzed to identify a set of feature points tracked among multiple frames of the video. As will be described, the identified set of feature points can be provided as input to an algorithm, such as a structure-from-motion (SfM) algorithm, to recover the camera motion path and sparse three-dimensional geometric representation of the scene.

To identify the set of feature points, each frame of the video can be mapped onto six planes of a cube map, where each plane is processed utilizing a standard KLT tracker algorithm, as described herein. When mapping each frame of the video to a cube map, a field-of-view greater than 45-degrees can be utilized to generate overlapping regions between image plans corresponding to the neighboring faces of the cube. In this way, artifacts due to feature points detected at the boundary of the faces can be mitigated. Once feature tracking is completed on the six images of a current frame, each feature tracked in the overlapping region can be assigned back to the original image plane it corresponds to. In this way, feature points that are close to the cube edges can be appropriately tracked.

After the set of feature points across the entire duration of the video is tracked, the SfM algorithm can be employed to process the sparse three-dimensional geometric representation of the subject scene and the camera parameters for each frame. In some embodiments, the SfM can be employed on a set of key frames (e.g., every $12^{th}$ frame), particularly for arbitrarily long videos. The next key frame for any key frame can be initialized with the camera parameters of the previous key frame. A bundle adjustment step can be performed to optimize the positions of the points tracked, and also the camera parameters of all the current key frames. After orientation and position of the camera for each key frame is determined, the cameras of the in-between frames can be initialized with a linear interpolation between the camera parameters of the neighboring key frames.

Once the camera motion path is recovered, at block 820, the recovered sparse three-dimensional geometric representation of the subject scene and the recovered camera parameters for each frame are utilized to generate a dense three-dimensional geometric representation of the subject scene. In essence, a depth map can be computed for each frame by iteratively performing random assignment and propagation operations, as described herein. In embodiments, the depth map of each frame can be initialized utilizing the sparse three-dimensional geometric representation obtained in block 810. More specifically, each recovered three-dimensional point can be mapped onto the unit sphere of each frame as a vertex, and as such, Delaunay Triangulation can be performed thereon. The depth value for each point can be determined, inside a triangle, by linearly interpolating the depth values of its vertices. Per-pixel depth values can also be determined by rasterizing the triangulation on the sphere, back onto the panorama image.

A propagation operation can refine the depth value of each pixel based on the depth of its neighbors, such that a matching cost is minimized. The matching cost can evaluate the normalized cross correlation score of a local window centered around a pixel in a reference image and its corresponding pixel in a neighboring image. For standard perspective images, this window can be defined as a square aligned with the image axes. In some embodiments, this local window can be defined directly on the unit sphere to uniformly capture the neighborhood of a point irrespective of its location on the sphere.

In further embodiments, the set of feature points identified in block 810 can also be filtered, such that those that incur a high matching cost and do not obey visibility constraints are removed. In this way, noise and outliers in the final dense three-dimensional geometric representation of the subject scene can be reduced.

At block 830, the recovered camera motion path can be processed and modified (e.g., smoothened) to remove any identifiable shakes in accordance with the recovered camera motion path. In other words, the camera motion path can represent parameters (e.g., position, orientation, translation) of the recording camera for substantially each frame of the video. The camera motion path can be analyzed to identify quick changes in camera motion path parameter values that may be indicative of camera shakes, jerking, instability, and the like. In accordance with embodiments described herein, as six-degree-of-freedom movements are detected (e.g., by a head-mounted display) and also utilized to warp frames to synthesize novel views based on the detected user motion, it is contemplated that different components of the camera motion can be stabilized independent from one another. By way of example, vertical oscillations may be removed, as off-vertical-axis motions can be maintained when desired. In another example, translation of the camera can be re-synthesized with constant speed to remove accelerations that can oftentimes lead to motion sickness.

Once the monoscopic 360-degree video is preprocessed in blocks 810, 820, and 830, a new, processed rendition of the video is provided for display at block 840. The processed rendition of the video is a rendering of images, frames, or views, of the dense three-dimensional geometric representation of the subject scene being traversed through in accordance with the recovered and modified camera path. In essence, the processed rendition of the video essentially recreates how the monoscopic 360-degree video traversed the scene at the time of recording, but now virtually through the dense three-dimensional geometric representation of the subject scene, and on a now smoother and more stabilized camera path. The processed rendition of the video can be provided for display to a user device, such as a head-mounted display operable to stereoscopically display to a user, received video inputs, among other things.

As described, the user device can obtain motion data from a user via one or more sensors that are in communication with a video conversion engine, such as video conversion engine 200 of FIG. 2. As user motion data is detected by the sensors and communicated to the video conversion engine, an image warping of a currently playing frame of the processed rendition of the video can take place. The image warping can be guided by a control triangular mesh defined on a unit sphere by icosahedron tessellation. In accordance with embodiments described herein, provided with a recovered reference current frame with a modified (e.g., smoothened) camera orientation and translation, and a desired novel viewpoint with detected orientation and translation (e.g., obtained via sensors of a head-mounted display), the current frame can be warped by determined parameters to transform or modify the current frame to the desired frame.

Accordingly, various aspects of technology for providing six-degree of freedom viewing of a monoscopic 360-degree video are described. It is understood that various features, sub-combinations, and modifications of the embodiments described herein are of utility and may be employed in other embodiments without reference to other features or sub-combinations. Moreover, the order and sequences of steps shown in the example methods 700 and 800 are not meant to limit the scope of the present invention in any way, and in fact, the steps may occur in a variety of different sequences within embodiments hereof. Such variations and combinations thereof are also contemplated to be within the scope of embodiments of the invention.

Having described various embodiments of the invention, an exemplary computing environment suitable for implementing embodiments of the invention is now described. With reference to FIG. 9, an exemplary computing device is provided and referred to generally as computing device 900. The computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more embodiments of the present invention. Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 presents data indications to a user or other device. Exemplary presentation components include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims

What is claimed is:

1. A non-transitory computer storage medium storing computer-useable instructions that, when used by one or more computing devices, cause the one or more computing devices to perform operations for providing six-degree of freedom viewing of a monoscopic 360-degree video, the operations comprising:
   recover, from a monoscopic 360-degree video of a subject scene, a sparse three-dimensional geometric representation of the subject scene and a camera motion path;
   generate a dense three-dimensional geometric representation of the subject scene based at least in part on the recovered sparse three-dimensional geometric representation of the subject scene and the recovered camera motion path; and
   synthesize at least one novel viewpoint of the subject scene based at least in part on a portion of a provided frame of the monoscopic 360-degree video, at least a portion of the dense three-dimensional representation of the subject scene, and obtained motion data.

2. The medium of claim 1, the operations further comprising:
   rendering the synthesized at least one novel viewpoint for display via a device, and wherein the motion data is obtained from the device.

3. The medium of claim 2, wherein the at least a portion of the dense three-dimensional representation of the subject scene is a visible portion of the provided frame.

4. The medium of claim 2, wherein the at least one novel viewpoint is stereoscopically provided for display.

5. The medium of claim 1, wherein the obtained motion data comprises orientation data and translation data.

6. The medium of claim 5, wherein the synthesized at least one novel viewpoint corresponds to the obtained motion data.

7. The medium of claim 5, wherein the at least one novel viewpoint is synthesized by warping the provided frame.

8. The medium of claim 7, wherein the at least one novel viewpoint is synthesized based further in part on a corresponding position of the camera motion path, the position corresponding substantially to the provided frame.

9. A 360-degree monoscopic video conversion engine comprising:
   a three-dimensional scene and motion path recovering means for recovering each of a sparse three-dimensional geometric representation of a subject scene and a camera motion path, each being recovered from a monoscopic 360-degree video of a subject scene;
   a point cloud generating means for generating a dense three-dimensional geometric representation of the subject scene based at least in part on the sparse three-dimensional geometric representation of the subject scene and the camera motion path; and
   a frame synthesizing means for synthesizing at least one novel viewpoint of the subject scene, wherein the at least one novel viewpoint is synthesized based at least in part on a provided frame of the monoscopic 360-degree video and obtained motion data.

10. The 360-degree monoscopic video conversion engine of claim 9, further comprising a display means for stereoscopically displaying at least the synthesized at least one novel viewpoint.

11. The 360-degree monoscopic video conversion engine of claim 9, wherein the provided frame is a currentlyrenderable frame of a processed instance of the monoscopic 360-degree video, the processed instance including the dense three-dimensional geometric representation of the subject scene and the recovered camera motion path.

12. The 360-degree monoscopic video conversion engine of claim 9, wherein the at least one novel viewpoint is synthesized based further in part on a corresponding position of the camera motion path, the position corresponding substantially to the provided frame.

13. The 360-degree monoscopic video conversion engine of claim 9, wherein the motion data comprises orientation data and translation data.

14. The 360-degree monoscopic video conversion engine of claim 9, wherein the at least one novel viewpoint is synthesized by warping the provided frame based at least in part on the obtained motion data.

15. A computing system for providing six-degree of freedom viewing of monoscopic 360-degree videos, the system comprising:
   a 360-degree monoscopic video conversion engine configured to:
   recover, from a monoscopic 360-degree video of a subject scene, a sparse three-dimensional geometric representation of the subject scene and a camera motion path, both being recovered based at least in part on a set of tracked feature points that each corresponds to a common three-dimensional point projected across at least a portion of a plurality of frames from the monoscopic 360-degree video;
   generate a dense three-dimensional geometric representation of the subject scene based at least in part on the recovered sparse three-dimensional geometric representation of the subject scene and the recovered camera motion path; and
   warp at least a portion of a provided frame of the monoscopic 360-degree video to provide for display a desired novel viewpoint, wherein the at least a portion of the provided frame is warped based at least in part on motion data obtained from a head-mounted device and a corresponding portion of the generated dense three-dimensional geometric representation.

16. The system of claim 15, wherein the desired novel viewpoint is provided for display as the motion data is obtained from the head-mounted device.

17. The system of claim 15, wherein the motion data comprises orientation data and translation data.

18. The system of claim 15, wherein a GPU of the head-mounted device is configured to warp the at least a portion of the provided frame.

19. The system of claim 15, wherein the portion of the provided frame is a viewable portion of the provided frame.

20. The system of claim 15, wherein the dense three-dimensional geometric representation of the subject scene is generated at least in part by computing a corresponding depth map for each frame of the monoscopic 360-degree video, each depth map comprising at least a portion of the set of tracked feature points mapped onto vertices of a unit sphere for the corresponding frame, and merging the computed depth maps into a single three-dimensional point cloud representation of the scene.

* * * * *

UNITED STATES PATENT AND TRADEMARK OFFICE
CERTIFICATE OF CORRECTION

PATENT NO. : 10,368,047 B2
APPLICATION NO. : 15/433333
DATED : July 30, 2019
INVENTOR(S) : Zhili Chen et al.

It is certified that error appears in the above-identified patent and that said Letters Patent is hereby corrected as shown below:

In the Specification

Column 22, Line 3: After "claims" insert -- . --.

Signed and Sealed this
Twentieth Day of December, 2022

Katherine Kelly Vidal
*Director of the United States Patent and Trademark Office*